(12) United States Patent
Guldenfels

(10) Patent No.: US 6,305,530 B1
(45) Date of Patent: Oct. 23, 2001

(54) MODULE FOR A MODULAR CONVEYING BELT

(75) Inventor: Dieter Guldenfels, Pfeffingen (CH)

(73) Assignee: Habasit AG (CH)

( * ) Notice: Subject to any disclaimer, the term of this patent is extended or adjusted under 35 U.S.C. 154(b) by 0 days.

(21) Appl. No.: 09/583,053

(22) Filed: May 30, 2000

(51) Int. Cl.⁷ .................. B65G 17/06; B65G 17/38
(52) U.S. Cl. ............... 198/853; 198/850; 198/851
(58) Field of Search ........................ 198/853, 850

(56) References Cited

U.S. PATENT DOCUMENTS

| | | | |
|---|---|---|---|
| D. 231,633 | 5/1974 | Totani et al. | D55/1 |
| D. 270,201 | 8/1983 | Hodlewsky et al. | D34/20 |
| D. 270,202 | 8/1983 | Hodlewsky et al. | D34/29 |
| D. 282,907 | 3/1986 | Schroeder et al. | D8/499 |
| D. 286,136 | 10/1986 | Schroeder et al. | D8/499 |
| D. 291,777 | 9/1987 | Lapeyre et al. | D8/499 |
| D. 307,707 | 5/1990 | Abbestam et al. | D8/499 |
| D. 419,742 | 1/2000 | Abbestam | D34/29 |
| D. 420,483 | 2/2000 | Abbestam | D34/29 |
| 526,072 * | 9/1894 | Dick . | |
| 1,134,688 * | 4/1915 | McWhorter . | |
| 2,911,091 | 11/1959 | Imse | 198/189 |
| 3,262,549 * | 7/1966 | Stewart et al. | 198/178 |
| 3,653,494 | 4/1972 | Miller | 198/195 |
| 3,672,488 | 6/1972 | Collins | 198/189 |
| 3,706,200 | 12/1972 | Mueller | 59/35 |
| 3,768,631 | 10/1973 | Wahren | 198/189 |
| 3,785,476 | 1/1974 | Poerink | 198/189 |
| 3,868,011 | 2/1975 | Janzen et al. | 198/195 |
| 3,870,141 | 3/1975 | Lapeyre et al. | 198/193 |
| 3,871,510 | 3/1975 | Homeier | 198/41 |
| 3,939,964 | 2/1976 | Poerink | 198/195 |
| 4,074,518 | 2/1978 | Taubert et al. | 59/15 |
| 4,078,654 | 3/1978 | Sarovich | 198/844 |
| 4,329,818 * | 5/1982 | Kavcic | 51/422 |
| 4,394,901 | 7/1983 | Roinestad | 198/850 |
| 4,429,785 | 2/1984 | Dango | 198/852 |
| 4,436,200 | 3/1984 | Hodlewsky et al. | 198/851 |
| 4,438,838 | 3/1984 | Hodlewsky et al. | 198/853 |
| 4,473,365 * | 9/1984 | Lapeyre | 474/212 |
| 4,557,374 | 12/1985 | Bode | 198/852 |

(List continued on next page.)

FOREIGN PATENT DOCUMENTS

| | | | |
|---|---|---|---|
| 0680994 * | 2/1964 | (CA) | 198/853 |
| 0867516 * | 2/1953 | (DE) | 198/850 |
| 0144455 | 12/1983 | (EP) | B65G/17/08 |

(List continued on next page.)

Primary Examiner—Donald P. Walsh
Assistant Examiner—Jeffrey A. Shapiro
(74) Attorney, Agent, or Firm—Hodgson Russ LLP

(57) ABSTRACT

A modular conveyor belt formed of rows of belt modules pivotally interlinked by transverse pivot rods. The modules include a top, product conveying surface and a bottom, sprocket-driven surface. The belt modules have a plurality of first link ends disposed in the direction of travel of the conveyor belt and a plurality of second link ends disposed in the opposite direction. Transverse holes in the link ends are aligned to accommodate a pivot rod. When the link ends of the consecutive rows of side by side modules are intercalated, the pivot rod serves as a hinge pin in a hinged joint between consecutive interlinked rows. To facilitate maintenance of the belt and to provide access to the transverse slots and the pivot rod without requiring the dismantling of the belt, the transverse slots are disposed at an angle relative to the top surface of the belt module such that when the belt modules are connected to form a belt the transverse slots in adjacent link ends are disposed at opposite angles. The pivot rod is captured by the two slots such that the belt modules are prevented from making translatory motion. As a result, the pivot rod and the inside of the slots are made more accessible without introducing any undesirable "play" or translatory motion between adjacent belt modules.

15 Claims, 5 Drawing Sheets

U.S. PATENT DOCUMENTS

| | | | |
|---|---|---|---|
| 4,586,601 | 5/1986 | Hodlewsky | 198/690.1 |
| 4,611,710 | 9/1986 | Mitsufuji | 198/803.01 |
| 4,618,056 | 10/1986 | Cutshall | 198/853 |
| 4,676,368 | 6/1987 | Damkjär | 198/852 |
| 4,688,670 | 8/1987 | Lapeyre | 198/853 |
| 4,709,807 | 12/1987 | Poerink | 198/853 |
| 4,729,469 | 3/1988 | Lapeyre et al. | 198/834 |
| 4,742,907 | 5/1988 | Palmaer | 198/831 |
| 4,754,872 | 7/1988 | Damkjaer | 198/852 |
| 4,858,753 | 8/1989 | Hodlewsky | 198/853 |
| 4,893,710 | 1/1990 | Bailey et al. | 198/853 |
| 4,901,844 | 2/1990 | Palmaer et al. | 198/778 |
| 4,903,824 | 2/1990 | Takahashi | 198/853 |
| 4,909,380 | 3/1990 | Hodlewsky | 198/779 |
| 4,925,016 | 5/1990 | Lapeyre | 198/834 |
| 4,934,517 | 6/1990 | Lapeyre | 198/852 |
| 4,949,838 | 8/1990 | Lapeyre et al. | 198/853 |
| 4,951,457 | 8/1990 | Deal | 59/78 |
| 4,958,726 | 9/1990 | Fett et al. | 198/852 |
| 4,972,942 | 11/1990 | Faulkner | 198/853 |
| 4,989,723 | 2/1991 | Bode et al. | 198/635 |
| 4,993,544 | 2/1991 | Bailey et al. | 198/834 |
| 5,000,312 | 3/1991 | Damkjaer | 198/853 |
| 5,020,656 | 6/1991 | Faulkner | 198/494 |
| 5,020,659 | 6/1991 | Hodlewsky | 198/853 |
| 5,027,944 | 7/1991 | Damkjaer | 198/852 |
| 5,031,757 | 7/1991 | Draebel et al. | 198/852 |
| 5,040,670 | 8/1991 | Mendoza | 198/834 |
| 5,065,860 | 11/1991 | Faulkner | 198/848 |
| 5,069,330 | 12/1991 | Palmaer et al. | 198/778 |
| 5,083,659 | 1/1992 | Bode et al. | 198/853 |
| 5,083,660 | 1/1992 | Horton | 198/853 |
| 5,096,050 | 3/1992 | Hodlewsky | 198/779 |
| 5,096,053 | 3/1992 | Hodlewsky | 198/853 |
| 5,105,938 | 4/1992 | Tan | 198/853 |
| 5,125,504 | 6/1992 | Corlett et al. | 198/850 |
| 5,133,449 | 7/1992 | Spangler | 198/778 |
| 5,139,135 | 8/1992 | Irwin et al. | 198/852 |
| 5,156,264 | 10/1992 | Lapeyre | 198/852 |
| 5,174,438 * | 12/1992 | Witham et al. | 198/851 |
| 5,176,247 | 1/1993 | Counter et al. | 198/831 |
| 5,181,601 | 1/1993 | Palmaer et al. | 198/831 |
| 5,217,110 | 6/1993 | Spangler et al. | 198/852 |
| 5,224,583 | 7/1993 | Palmaer et al. | 198/779 |
| 5,247,789 | 9/1993 | Abbestam et al. | 59/78 |
| 5,271,491 | 12/1993 | Irwin | 198/778 |
| 5,280,833 | 1/1994 | Robin | 198/831 |
| 5,303,818 | 4/1994 | Gruettner et al. | 198/850 |
| 5,305,869 | 4/1994 | Damkjaer | 198/689.1 |
| 5,309,705 | 5/1994 | Takahaski et al. | 59/78 |
| 5,310,045 | 5/1994 | Palmaer et al. | 198/778 |
| 5,310,046 | 5/1994 | Palmaer et al. | 198/831 |
| 5,330,046 * | 7/1994 | Yuzawa et al. | 198/850 |
| 5,332,084 | 7/1994 | Greve | 198/853 |
| 5,339,946 | 8/1994 | Faulkner et al. | 198/494 |
| 5,346,060 | 9/1994 | Ferguson | 198/853 |
| 5,361,893 | 11/1994 | Lapeyre et al. | 198/853 |
| 5,372,248 | 12/1994 | Horton | 198/852 |
| 5,413,211 | 5/1995 | Faulkner | 198/690.2 |
| 5,419,428 | 5/1995 | Palmaer et al. | 198/831 |
| 5,425,443 | 6/1995 | van Zijderveld et al. | 198/834 |
| 5,431,275 | 7/1995 | Faulkner | 198/853 |
| 5,435,435 | 7/1995 | Chiba et al. | 198/853 |
| 5,439,099 | 8/1995 | Bos et al. | 198/853 |
| 5,490,591 | 2/1996 | Faulkner | 198/803.13 |
| 5,507,383 | 4/1996 | Lapyere et al. | 198/853 |
| 5,547,071 | 8/1996 | Palmaer et al. | 198/853 |
| 5,562,200 | 10/1996 | Daringer | 198/844.2 |
| 5,566,817 | 10/1996 | Meeker | 198/848 |
| 5,573,105 | 11/1996 | Palmaer | 198/853 |
| 5,573,106 | 11/1996 | Stebnicki | 198/853 |
| 5,586,643 | 12/1996 | Zabron et al. | 198/853 |
| 5,613,597 | 3/1997 | Palmaer et al. | 198/853 |
| 5,628,393 | 5/1997 | Steeber et al. | 198/699.1 |
| 5,634,550 | 6/1997 | Ensch et al. | 198/457 |
| 5,645,160 | 7/1997 | Palmaer et al. | 198/853 |
| 5,690,210 | 11/1997 | Layne | 198/853 |
| 5,697,492 | 12/1997 | Damkjaer | 198/852 |
| 5,706,934 | 1/1998 | Palmaer et al. | 198/853 |
| 5,738,205 | 4/1998 | Draebel | 198/852 |
| 5,779,027 | 7/1998 | Ensch et al. | 198/841 |
| 5,850,902 | 12/1998 | Hicks et al. | 198/457 |
| 5,850,905 | 12/1998 | Foster | 198/750.3 |
| 5,860,507 | 1/1999 | Foster | 198/750.3 |
| 5,904,241 | 5/1999 | Verdigets et al. | 198/853 |
| 5,906,270 | 5/1999 | Faulkner | 198/853 |
| 5,911,305 | 6/1999 | Layne | 198/832 |
| 5,921,379 | 7/1999 | Horton | 198/852 |
| 5,954,190 | 9/1999 | Takahashi et al. | 198/853 |
| 5,988,363 | 11/1999 | Takahashi et al. | 198/841 |
| 5,996,776 | 12/1999 | van Zijderveld | 198/853 |
| 6,019,215 | 2/2000 | Foster | 198/750.3 |

FOREIGN PATENT DOCUMENTS

| | | | |
|---|---|---|---|
| 0355080 | 8/1989 | (EP) | B65G/17/08 |
| 0477205 | 4/1990 | (EP) | B65G/17/08 |
| 0521506 | 7/1992 | (EP) | B65G/17/08 |
| 0621851 | 1/1993 | (EP) | B65G/17/08 |
| 0567337 | 4/1993 | (EP) | B65G/17/08 |
| 0739830 | 4/1993 | (EP) | B65G/17/08 |
| 0654426 | 10/1994 | (EP) | B65G/17/08 |
| 9015763 | 12/1990 | (WO) | B65G/17/08 |
| 9505986 | 3/1995 | (WO) | B65G/17/06 |

* cited by examiner

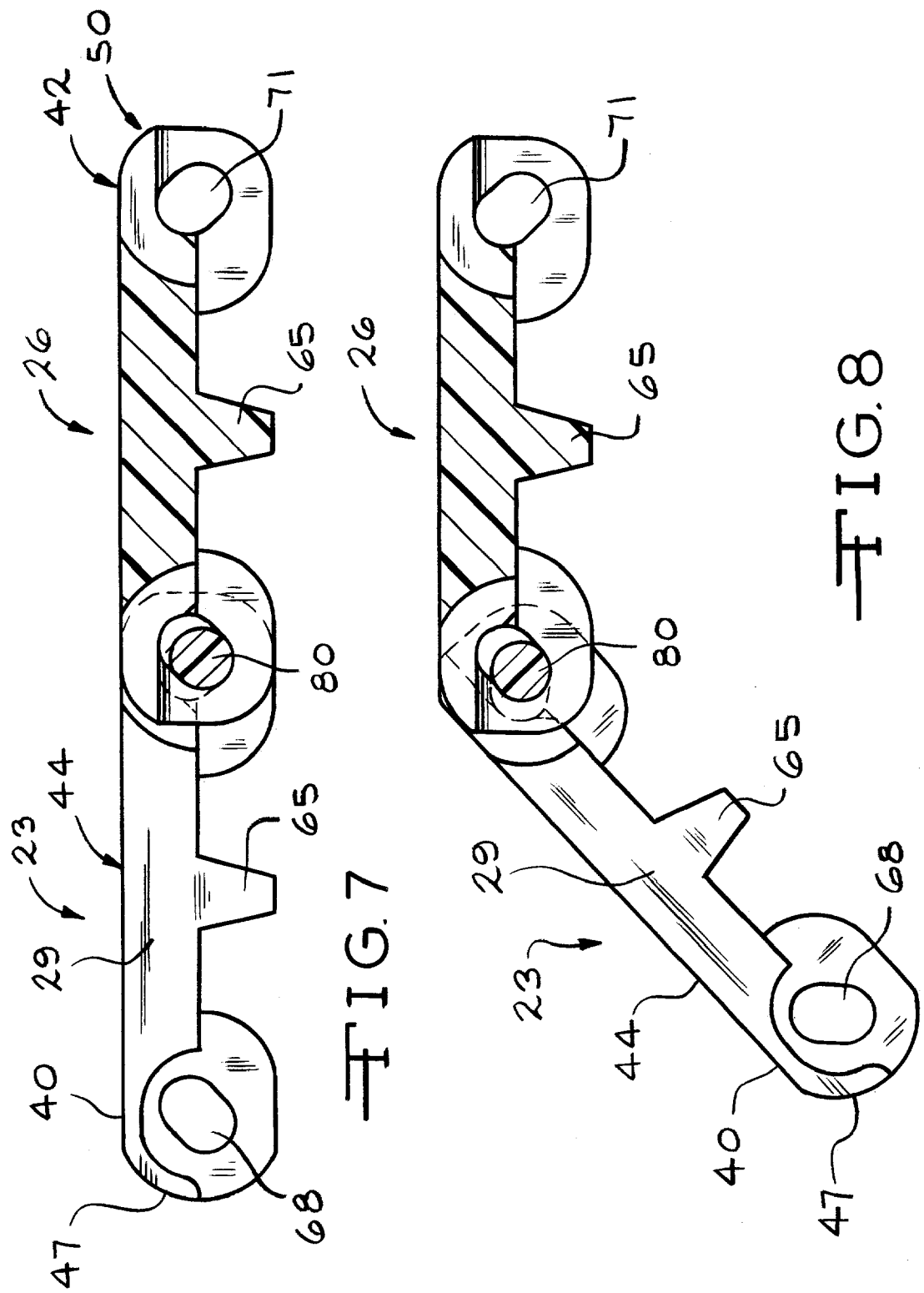

MODULE FOR A MODULAR CONVEYING BELT

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they are light weight, do not corrode, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures or slots to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

In order to avoid having parts of the goods that are to be conveyed, such as food particles, from entering into the apertures or slots in the link ends and contacting the pivot rods, which can cause unsanitary conditions, modular conveying belts are typically designed such that when they are rectilinear, they form a totally continuous, planar conveying surface. Typically, the link ends are narrow and in an assembled conveyor belt, the interconnected link ends completely enclose the pivot rods where they pass through the link ends. Also, the pivot rod apertures and slots in the link ends afford better space for accessing the pivot rods, especially in an assembled conveyor belt. Having large portions of the pivot rods fully enclosed at all times by the link ends prevents thorough cleaning of both the pivot rods and their apertures or slots, unless the conveying belt is dismantled. Accordingly, what is needed is a conveyor belt constructed of modules designed such that the pivot rods and the link end apertures or slots can be cleaned without dismantling the belt.

SUMMARY OF THE INVENTION

The present invention meets the above-described need by providing an endless conveyor belt formed of plastic belt modules having slots in their link ends that are disposed at an angle relative to the plane defined by the top surface of the belt module.

The modules include first and second module surfaces, i.e., a top, product-conveying surface and a bottom, sprocket-driven surface. An intermediate section extends between the first and second module surfaces and across each module transverse to the direction of belt travel. The intermediate section supports a first plurality of link ends at one end and supports a second plurality of link ends at the opposite end. Elongate transverse slots are disposed in the link ends and are aligned to accommodate a pivot rod. When the link ends of consecutive rows of side-by-side modules are intercalated, the pivot rod serves as a hinge pin in a hinged joint between consecutive interlinked rows.

The belt is driven by engagement of the teeth on a sprocket as known to those of ordinary skill in the art to which the invention pertains.

In an assembled conveyor belt, adjacent belt modules align with each other such that the transverse slots in the adjacent link ends are angled in opposite directions. As a result, the pivot rod is captured by the respective slots in an overlapping area so that the pivot rod is confined to a portion of each of the elongate slots and is not free to move along the entire length of either of the slots. Accordingly, the cooperation of the adjacent angled slots prevents translatory motion of the pivot rod, and provides access to the transverse slot and to the pivot rod for cleaning. Accordingly, the present design provides for greater access to the inside of the transverse slots and to the pivot rods for better cleaning and easier maintenance. The enhancement is provided without introducing any undesirable translatory motion or "play" in the belt.

BRIEF DESCRIPTION OF THE DRAWINGS

The invention is illustrated in the drawings in which like reference characters designate the same or similar parts throughout the figures of which:

FIG. 7 is a sectional view taken along lines 7—7 of FIG. 4; and,

FIG. 8 is a sectional view of the belt shown in FIG. 4 with the belt modules having been pivoted with respect to one another.

DETAILED DESCRIPTION OF THE PREFERRED EMBODIMENTS

Figure 2:
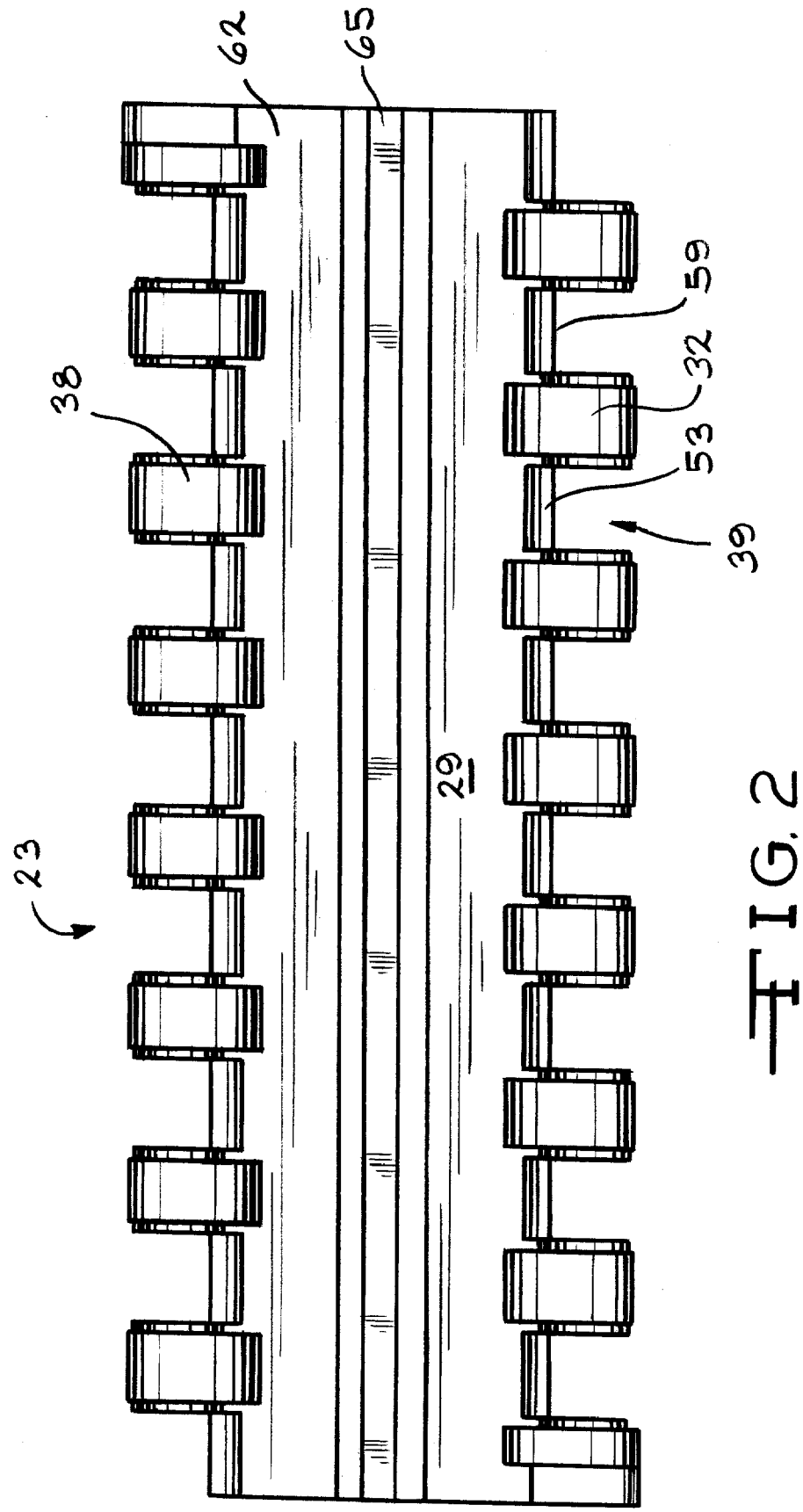
FIG. 2 is a bottom plan view of the belt module of FIG. 1.
Figure 3:
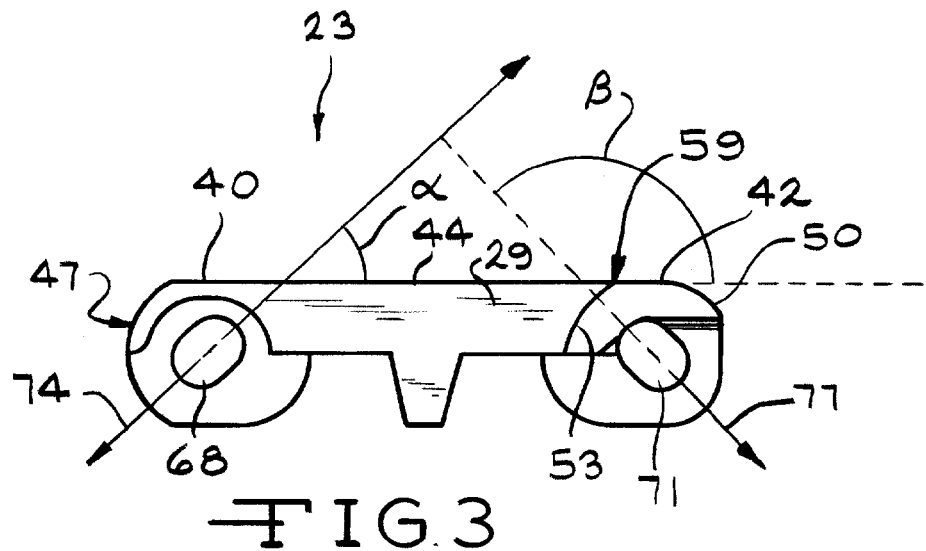
FIG. 3 is a side elevation view of the belt module of FIG. 1.
Figure 4:
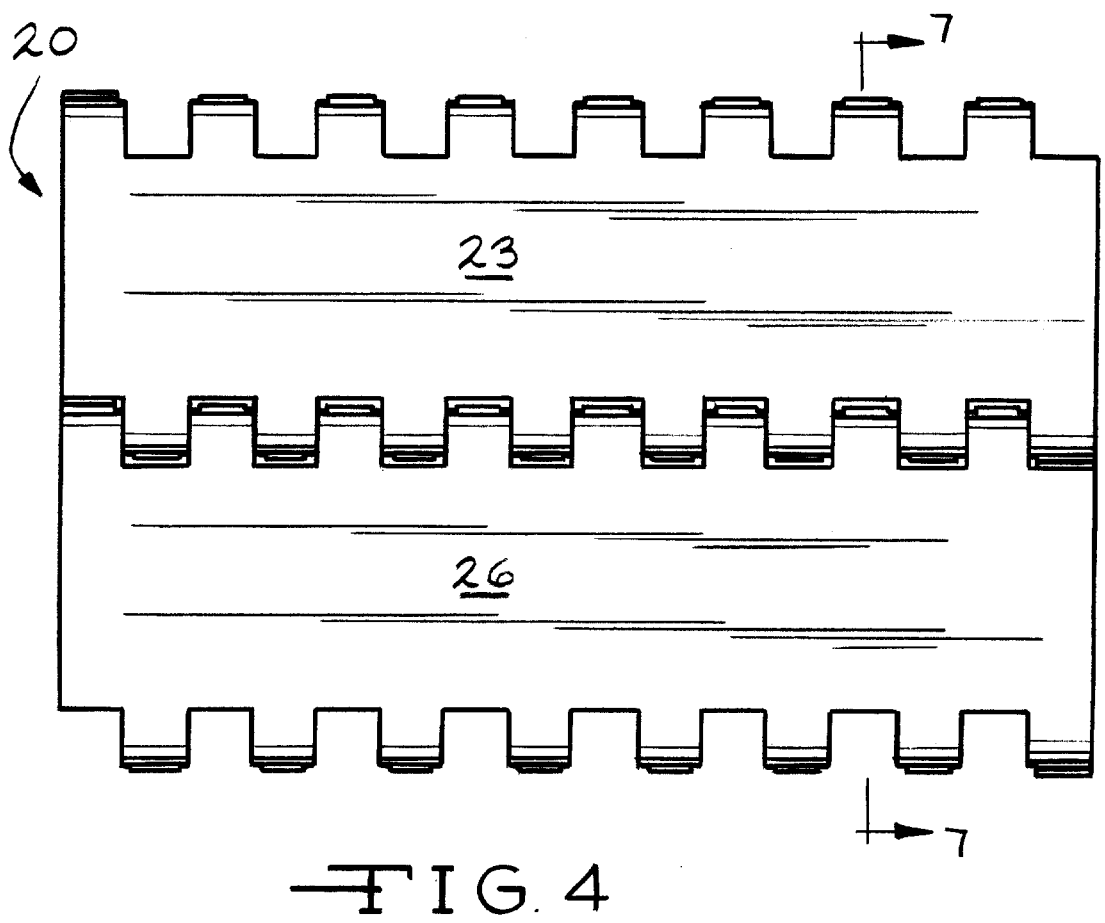
FIG. 4 is a plan view of a modular belt according to the present invention.

Referring to FIGS. 1 to 8 generally and initially to FIG. 4, the flat top modular belt 20 of the present invention is formed from interconnected belt modules 23 and 26. Although the belt 20 is shown with two modules 23, 26, the belt 20 may include several modules in order to provide belts 20 having different widths. Also, each module does not have to be the same width, and the modules can be formed in "bricklayed" fashion as known to those of ordinary skill in the art.

Figure 1:
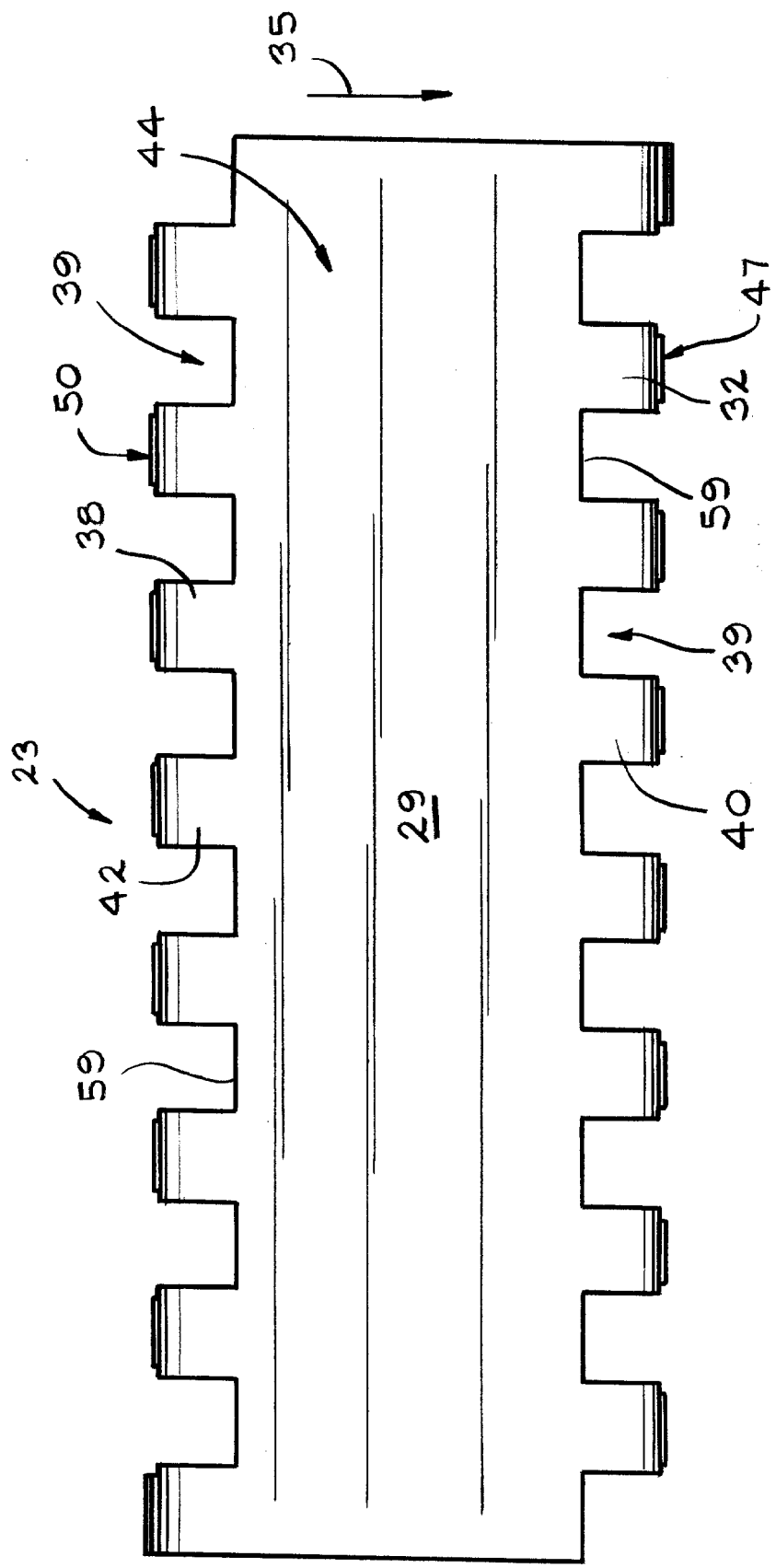
FIG. 1 is a top plan view of a belt module of the present invention.

Referring to FIG. 1, belt module 23 is preferably formed out of plastic or other material suitable for food handling which is light weight, does not corrode, and may be easily cleaned. The belt module 23 is preferably thermoformed out of a plastic resin raw material as known to those of ordinary skill in the art. The module 23 has an intermediate section 29 that supports a first set of link ends 32 disposed in the direction of belt travel indicated by arrow 35. The direction of belt travel is provided for reference only as the belt 20 of the present invention may be driven in either direction. The intermediate section 29 also supports a second set of link ends 38 that are disposed in the opposite direction from the first set of link ends 32. The spaces 39 between successive link ends 32, 38 are sized so as to accept a link end 32, 38 from an adjacent belt module (best shown in FIG. 4). The intermediate section 29 and portions 40, 42 of the link ends 32, 38, respectively, are coplanar along the top surface 44 such that the top surface 44 is substantially flat when adjacent modules 23, 26 are connected (best shown in FIG. 6). The ends 47, 50 of the link ends 32, 38 are curved to fit into the curved section 53 (best shown in FIG. 3) formed along portions of the edge 59 of the intermediate section 29. Accordingly, when the belt 20 is assembled with pivot rods as described hereafter, the top surface 44 is substantially flat and the gaps, which are located between modules and where food parts can enter the belt 20, are minimized.

As shown in FIG. 2, the bottom surface 62 of the belt module 23 has a stiffening web 65 disposed along the center of the module 23. The stiffening web 65 provides structural rigidity to the module 23 and also may be used for a contact point for the sprocket (not shown) that drives the belt 20 from below. As known to those of ordinary skill in the art, a drive sprocket may engage the link ends 32, 38 and the web 65 to drive the belt 20 from below. The modules 23, 26 are connected end to end as shown in FIG. 4 and are combined with other modules to form an endless belt that is driven and guided by drive sprockets and idler sprockets (not shown) as known to those of ordinary skill in the art.

Figure 6:
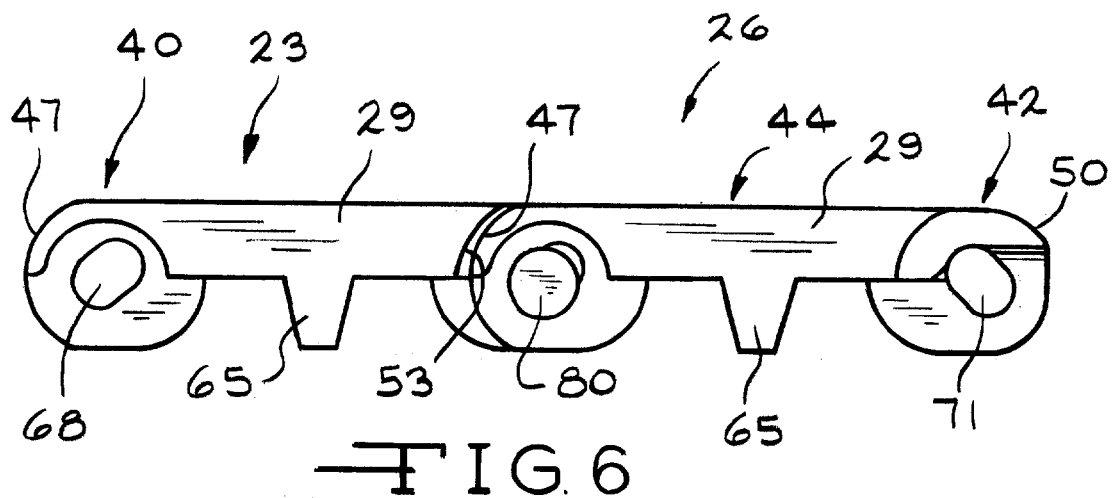
FIG. 6 is a side elevation view of the belt shown in FIG. 4.

As shown in FIG. 2, the curved portion 53 of the intermediate section 29 is disposed adjacent to the spaces 39 between the link ends 32, 38 to accept the curved portions 40, 42 of the link ends 32, 38 as best shown in FIG. 6.

In FIG. 3, the curved portion 47 of the link end 32 is shown at one end of the figure and at the opposite end of the figure the curved surface 50 at the end of the second link end 38 is shown. Also, first and second elongate transverse slots 68, 71 are shown. The transverse slots 68, 71 have longitudinal axes 74 and 77 respectively. The transverse slots 68, 71 are preferably elongate and oval-shaped. The transverse slots 68 are angled at an angle α which is 10° to 80° relative to the horizontal axis defined by top surface 44. The preferred embodiment provides for an angle α of approximately 45°. The slots 71 on opposite ends of the module are rotated by approximately 90° such that they are disposed at an angle β approximately 100° to 170° to the top surface 44. The preferred embodiment for the second slot 71 is an angle β of approximately 135°.

In FIG. 4, a portion of the assembled belt 20 is shown. The adjacent belt modules 23, 26 are intercalated and connected to each other by a pivot rod 80 as shown in FIGS. 5–8.

Turning to FIG. 6, the pivot rod 80 is disposed through the transverse slots 68, 71. Adjacent slots 68, 71 are angled in opposite directions. When the pivot rod 80 is threaded through adjacent link ends 32, 38 the adjacent slots 68, 71 capture the pivot rod 80 such that it is held in the overlapping portion of the adjacent slots. Because the angled slots 68, 71 are disposed at an approximately 90° angle with respect to each other in the preferred embodiment of the present invention having the respective slots at an angle α of approximately 45° and an angle β of approximately 135° for the intercalated modules 23, 26, the pivot rod 80 is captured in the area of overlap of the adjacent slots 68, 71 and is not allowed to travel along the length of the elongated slots 68, 71. In this manner and even though the angled slots 68, 71 are elongate, the link ends 32, 38 are fixed relative to each other and are not capable of translatory movement relative to each other. The link ends 32, 38 are only capable of rotating relative to each other. Accordingly, with reference to FIGS. 6–8, there is a very small, if any, amount of "play" in the direction of belt travel 35 or the opposite direction, and the modules 23, 26 cannot make translatory motion relative to one another. The modules 23, 26 can only rotate about the pivot rod 80 relative to each other as shown in FIG. 8.

Figure 5:
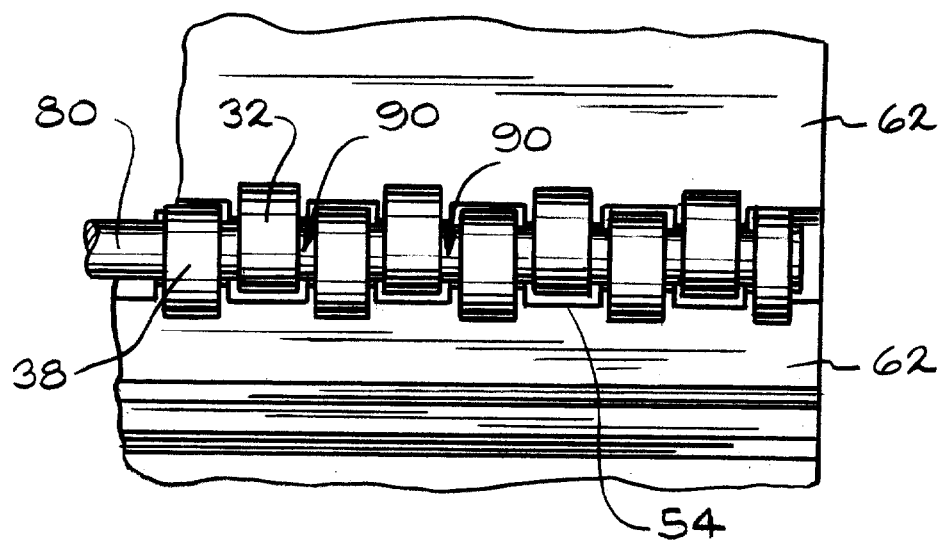
FIG. 5 is a partial enlarged detail view of the bottom of the belt shown in FIG. 4.

Accordingly, because the angled transverse slots 68, 71 are oversized and elongate relative to the pivot rod 80, there is much greater access to the transverse slots 68, 71 and to the pivot rod 80 in comparison to conventional transverse openings. Accordingly, the belt 20 of the present invention is easier to clean without disassembling the belt. As can be seen in FIG. 5, the link ends 32, 38 provide a gap 90, leaving the pivot rod 80 exposed from the bottom side of the module, whereas it remains totally closed from the top side. During cleaning operation pressurized cleaning fluid such as water spray may easily enter the gap 90 from the bottom of the module and reach the exposed pivot rod 80 through the enlarged openings 68, 71. Further, the slotted transverse openings 68, 71 allow the fluid to enter from the side of the link and get access to the pivot rod also inside of the openings 68, 71.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, comprising:
   a) an intermediate section having a top surface;
   b) a first plurality of link ends, each having opposed side walls providing the first link ends with a first transverse thickness connected to the intermediate section at a first proximal portion and extending from the intermediate section in a direction of belt travel to a first distal portion at the link ends, wherein the first link ends each have a first slot through the thickness between and to the opposed side walls, the first slots being elongated in a direction of the first distal portion to the first proximal portion of the first link ends and comprising spaced apart parallel first upper and first lower walls extending to and meeting with opposed first proximal and first distal end walls proximate the respective proximal and distal portions of the first link ends, the first upper and first lower walls being disposed at a first acute angle with respect to the top surface;
   c) a second plurality of link ends, each having opposed side walls providing the second link ends with a second transverse thickness connected to the intermediate section at a second proximal portion and extending from the intermediate section in a direction opposite to the first link ends to a second distal portion at the link ends, wherein the second link ends each have a second slot through the thickness between and to the opposed side walls, the second slots being elongated in a direction of the second distal portion to the second proximal portion of the second link ends and comprising spaced apart parallel second upper and second lower walls extending to and meeting with opposed second proximal and second distal end walls proximate the respective proximal and distal portions of the second link ends, the second upper and second lower walls being disposed at a second acute angle with respect to the top surface, the first and second acute angles being reflective, and wherein the second link ends are offset from the first link ends such that adjacently positioned belt modules are capable of being intercalated so that the first link ends of one belt module fit into spaces defined between the second link ends of an adjacent belt module.

2. The belt module of claim 1, wherein the intermediate section has a stiffening web disposed thereon.

3. The belt module of claim 2, wherein the stiffening web is disposed on a side of the belt module opposite from the top surface.

4. The belt module of claim 1, wherein the first and second acute angles are about 10° to about 80° with respect to the top surface.

5. The belt module of claim 1, wherein the first and second acute angles are about 40° to about 45° with respect to the top surface.

6. A modular belt, comprising:

a) a plurality of belt modules, each having an intermediate section having a top surface, a first plurality of link ends, each having opposed side walls providing the first link ends with a first traverse thickness connected to the intermediate section at a first proximal portion and extending from the intermediate section in a direction of belt travel to a first distal portion at the link ends, wherein the first link ends each have a first slot through the thickness between and to the opposed side walls, the first slots being elongated in a direction of the first distal portion to the first proximal portion of the first link ends and comprising spaced apart parallel first upper and first lower walls extending to and meeting with opposed first proximal and first distal curved end walls proximate the respective proximal and distal portions of the first link ends, the first upper and first lower walls being disposed at a first acute angle with respect to the top surface, and a second plurality of link ends, each having opposed side walls providing the second link ends with a second transverse thickness connected to the intermediate section at a second proximal portion and extending from the intermediate section in a direction opposite to the first link ends to a second distal portion of the link ends, wherein the second link ends each have a second slot through the thickness between and to the opposed side walls, the second slots being elongated in a direction of the second distal portion to the second proximal portion of the second link ends and comprising spaced apart parallel second upper and second lower walls extending to and meeting with opposed second proximal and second distal curved end walls proximate the respective proximal and distal portions of the second link ends, the second upper and second lower walls being disposed at a second acute angle with respect to the top surface, the first and second acute angles being reflective, wherein the belt modules are disposed such that the first link ends on a first belt module are offset and intercalated between spaces defined between the second link ends on an adjacent belt module; and b) a pivot rod disposed through the transverse slots in the first and second link ends of adjacent belt modules.

7. The modular belt of claim 6, wherein the respective first and second acute angles of the first and second slots of intercalated first and second link ends are disposed at an angle of approximately 90° with respect to each other.

8. The modular belt of claim 7, wherein the pivot rod is threaded through the first and second slots of adjacent belt modules such that the pivot rod is captured in the overlapping region of the first and second slots of the adjacent belt modules such that translatory motion of adjacent belt modules is prevented.

9. The modular belt of claim 6, wherein the first and second acute angles are about 10° to about 80° with respect to the top surface.

10. The modular belt of claim 6, wherein the first and second acute angles are about 40° to about 50° with respect to the top surface.

11. The modular belt of claim 6, wherein the intercalated link ends form a gap between immediately adjacent side walls of connected first and second belt modules, the gap being accessible from the bottom of the modules and being disposed adjacent to the first and second slots.

12. A modular belt, comprising:

a) a plurality of belt modules, each having an intermediate section having a top surface and supporting a first plurality of link ends comprising opposed side walls providing the first link ends with a first transverse thickness connected to the intermediate section at a first proximal portion and disposed in the direction of belt travel to a first distal portion at the link ends and having a second plurality of link ends, each having opposed side walls providing the second link ends with a second transverse thickness connected to the intermediate section at a second proximal portion and disposed in a direction opposite from the first link ends to a second distal portion at the link ends, the first and second link ends having first and second slots through the thickness between and to the opposed side walls of the respective first and second link ends, the first and second slots being elongated along respective first and second longitudinal axes extending in a direction of the first distal portions of the first link ends to the first proximal portions and in a direction of the second distal portions of the second link ends to the second proximal portions, wherein the first slots have a generally oval cross-section along the length of the first link ends and comprise spaced apart parallel first upper and first lower walls extending to and meeting with opposed first proximal and first distal curved end walls proximate the respective proximal and distal portions of the first link ends, and wherein the second slots have a generally oval cross-section along the length of the second link ends and comprise spaced apart parallel second upper and second lower walls extending to and meeting with opposed second proximal and second distal curved end walls proximate the respective proximal and distal portions of the second link ends, the first and second longitudinal axes of the first and second slots being reflective and disposed at an angle α of about 40° to about 50° with respect to the top surface, the first and second link ends being offset from one another such that when the belt modules are placed adjacent to one another the first link ends on a first belt module are capable of intercalating with the second link ends on an adjacent belt module to form a continuous belt; and b) a pivot rod disposed through the first and second slots on adjacent belt modules.

13. The modular belt of claim 12, wherein the intercalated link ends form a gap between immediately adjacent side walls of connected first and second belt modules, the gap being accessible from the bottom of the modules and being disposed adjacent to the first and second slots.

14. A belt module, which comprises:

a) an intermediate section having a top surface;

b) a first plurality of link ends, each having opposed side walls providing the first link ends with a first transverse thickness connected to the intermediate section at a first proximal portion and extending from the intermediate section in a direction of belt travel to a first distal portion at the link ends, wherein the first link ends each have a first slot through the thickness, the first slots comprising spaced apart first upper and first lower planar walls extending to and meeting with opposed first proximal and first distal curved walls proximate the respective proximal and distal portions of the first link ends and extending to and between the opposed side walls, the first slots being elongated along a first longitudinal axis of the first slots extending from the first distal portions to the first proximal portions of the link ends, and wherein at least where the first upper and the first lower planar walls connect to the first distal curved wall proximate the distal portion of the link ends, they are spaced apart a first distance sufficient to provide a first opening for receiving the diameter of a pivot rod;

c) a second plurality of link ends, each having opposed side walls providing the second link ends with a second transverse thickness connected to the intermediate section at a second proximal portion and extending from the intermediate section in a direction opposite to the first link ends to a second distal portion at the link ends, wherein the second link ends each have a second slot through the thickness, the second slots comprising spaced apart second upper and second lower planar walls extending to and meeting with opposed second proximal and second distal curved walls proximate the respective proximal and distal portions of the second link ends and extending to and between the opposed side walls, the second slots being elongated along a second longitudinal axis of the second slots extending from the second distal portions to the second proximal portions of the second end links, and wherein at least where the second upper and the second lower planar walls connect to the second distal curved wall proximate the distal portion of the link ends, they are spaced apart a second distance sufficient to provide a second opening for receiving the diameter of the pivot rod; and d) the first longitudinal axis disposed at a first acute angle with respect to a plane through mirror image first and second transverse axes along the first and second thicknesses of the respective first and second link ends and the second longitudinal axis being disposed at a second acute angle with respect to the plane, the first and second acute angles being reflective, and wherein the second link ends are offset from the first link ends such that adjacently positioned belt modules are capable of being intercalated so that the first link ends of one belt module fit into spaces defined between the second link ends of an adjacent belt module, and wherein the first and second openings are positioned in the respective first and second link ends such that a first module is intercalatable with a second module by a pivot rod captured in the first and second openings of the respective first and second slots, and the pivot rod is not capable of travel along the length of either the first or the second link ends.

15. A modular belt, which comprises:

a) a plurality of belt modules, each having an intermediate section having a top surface; a first plurality of link ends, each having opposed side walls providing the first link ends with a first traverse thickness connected to the intermediate section at a first proximal portion and extending from the intermediate section in a direction of belt travel to a first distal portion at the link ends, wherein the first link ends each have a first slot through the thickness and extending to and between the opposed side walls, the first slots being elongated along a first longitudinal axis of the first slots extending from the first distal portions to the first proximal portions of the link ends, and comprising spaced apart first upper and first lower planar walls extending to and meeting with opposed first proximal and first distal curved walls proximate the respective proximal and distal portions of the first link ends, and wherein at least where the first upper and the first lower planar walls connect to the first distal curved wall proximate the distal portion of the link ends, they are spaced apart a distance sufficient to receive the diameter of a pivot rod; and a second plurality of link ends, each having opposed side walls providing the second link ends with a second transverse thickness connected to the intermediate section at a second proximal portion and extending from the intermediate section in a direction opposite to the first link ends to a second distal portion of the link ends, wherein the second link ends each have a second slot through the thickness and extending to and between the opposed side walls, the second slots being elongated along a second longitudinal axis of the second slots extending from the second distal portions to the second proximal portions of the second end links, and comprising spaced apart second upper and second lower planar walls extending to and meeting with opposed second proximal and second distal curved walls proximate the respective proximal and distal portions of the second link ends, and wherein at least where the second upper and the second lower planar walls connect to the second distal curved wall proximate the distal portion of the link ends, they are spaced apart a distance sufficient to receive the diameter of the pivot rod, the first longitudinal axis being disposed at a first acute angle with respect to a plane through mirror image first and second transverse axes along the first and second thicknesses of the respective first and second link ends and the second longitudinal axis being disposed at a second acute angle with respect to the plane, the first and acute second angles being reflective, and wherein the belt modules are disposed such that the first link ends on a first belt module are offset and intercalated between spaces defined between the second link ends on an adjacent belt module; and b) a pivot rod disposed through the transverse slots in the first and second link ends of adjacent belt modules, wherein the intercalated link ends provide the modular belt with a continuous upper conveying surface of the top surfaces of the intercalated belt modules and the intercalated link ends form a gap between immediately adjacent side walls of connected first and second belt modules, the gap providing access to the pivot rod only from the bottom of the modules adjacent to the first and second slots.

* * * * *